J. P. CULLISON.
VALVE.
APPLICATION FILED FEB. 4, 1921.

1,430,361.

Patented Sept. 26, 1922.

Inventor
John P. Cullison

By  P. C. Shepherd
Attorney

Patented Sept. 26, 1922.

1,430,361

UNITED STATES PATENT OFFICE.

JOHN P. CULLISON, OF COLUMBUS, OHIO.

VALVE.

Application filed February 4, 1921. Serial No. 442,525.

*To all whom it may concern:*

Be it known that JOHN P. CULLISON, a citizen of the United States, residing at Columbus, in the county of Franklin and State of Ohio, has invented certain new and useful Improvements in Valves, of which the following is a specification.

This invention relates to improvements in valves or stop cocks for fluid systems, and has for its primary object to provide a valve structure primarily adapted for the purpose of closing an outlet of a fluid receiving system in which fluid under relatively high pressures is carried, the construction being such that the head or plug of the valve will be firmly retained within a ground conical seat in such manner that undue fluid escape will be effectually precluded and the presence of foreign matter between the plug and seat eliminated.

In carrying out the invention I employ a valve structure of the aforesaid character wherein is embodied a casing having a substantially conical valve seat or socket formed therein which is adapted to receive a similarly formed rotatable valve plug, the latter being of hollow construction and having near its apex an outlet port, the interior of the plug being in communication with the interior of a fluid containing system in order that upon the registration of the port with the outlet provided in the valve casing proper, fluid will be permitted to flow through the valve, and to provide means of a novel character which will operate upon the plug in such manner as to tightly force the plug into its conical seat, independently of the fluid pressure, and in this manner to prevent sediment and foreign matter contained within the fluid from working between the plug and the seat, thus enabling the valve plug at all times to be capable of being freely rotated without sticking and also to prevent the leakage of fluid around the valve plug.

A further object of the invention consists in providing the interior of the casing of the valve structure adjacent the conical valve plug socket with a threaded adjustable sleeve, which is capable of being tightened into frictional engagement with the conical valve plug and in such manner as to cause the latter to be tightly forced within its conical socket provided in the valve casing, in order that the frictional relationship between the outer surface of the plug and the walls of the socket therefor may be maintained in a manner independent of the fluid pressure within the system regulated by the valve.

A still further object of the invention resides in improving, simplifying and reducing the cost of manufacture of the construction disclosed in my previous Patent No. 829,632, issued August 28, 1906. With these and other objects in view, as will appear as the description proceeds, the invention accordingly consists in the novel features of construction, combinations of elements and arrangements of parts, hereinafter to be fully described and having the scope thereof pointed out in the appended claim.

Figure 1:
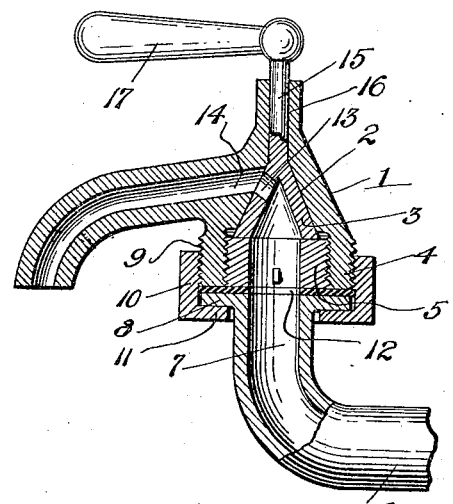
Figure 1 is a vertical sectional view taken through the valve comprising the present invention and illustrating the adaption of the latter in the capacity of an ordinary water faucet.
Figure 3:
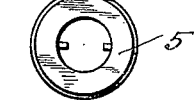

Referring more particularly to the details of the invention, my improved valve structure consists of a valve casing 1, preferably formed from metal, of any suitable size and design, and capable of being employed for many various or different purposes. The casing is formed to include a substantially conical plug socket or seat 2, the walls of which are preferably machined or ground so as to be smoothly and accurately finished. Arranged to be received within the socket 2 is a valve plug or head 3, which is adapted to be positioned within the conical portions of the socket 2, and the outer walls of the plug 3 are suitably finished or ground so as to be capable of snugly engaging the walls of the socket 2 and to produce a tight fitting relation which will tend to overcome all looseness between parts. The socket 2 is extended into an enlarged threaded portion 4, in which is positioned a threaded ring or sleeve 5, comprising the gist of the present invention. By the provision of the sleeve or ring 5, it will be manifest that the plug 3 may be securely forced into the conical portions of the socket 2 so that the necessary relationship between the plug 3 and the socket 2 may be maintained independently of the fluid pressure exerted upon the plug.

There are many different ways whereby the casing 1 may be mounted for use. For instance, as shown in Figure 1, a supply or water pipe 6 has been illustrated, and this pipe has been formed to terminate in an upwardly and vertically extending portion 7, the extended end of which has a flanged head or collar 8 upon which the casing 1 is adapted to be positioned and supported. To secure the casing rigidly in connection with the collar 8, the lower portion of the casing is exteriorly threaded as at 9 to receive a nut 10, which has an inwardly projecting annular lip 11 capable of engaging the under portion of the collar 8. The nut 10 is provided with an exterior polygonal surface capable of receiving a wrench or other similar tool for the purpose of tightening the nut 10 into holding engagement with the lip 11. Preferably, a gasket 12 is inserted between the lower end of the valve casing 1 and the collar 8, in order that the action of the nut 10 may be rendered more effective, and to prevent the flow of fluid between the joint connection existing between the pipe 6 and the valve casing.

Figure 2:
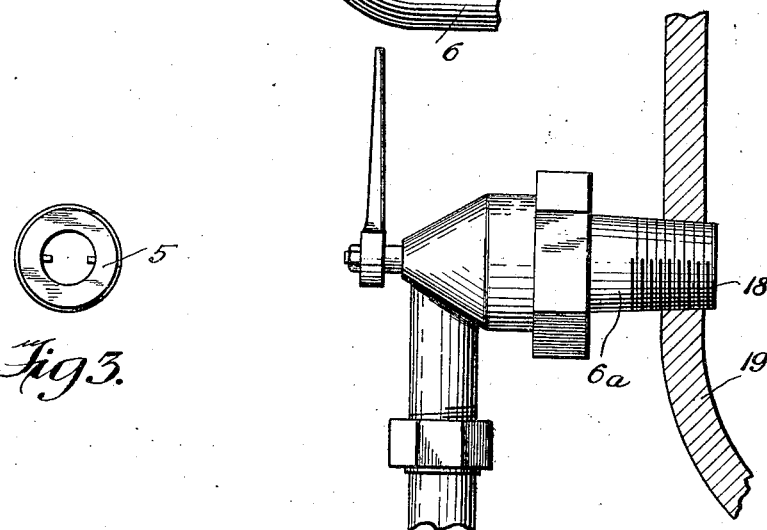
Figure 2 is a similar view disclosing the construction of the valve when employed in the capacity of a stop cock for locomotive boilers, and, Figure 3 is a detail view of the adjusting sleeve.

It will be understood that fluid under pressure is permitted to flow through the pipe 6 and thence through the ring or sleeve 5 and into the pocket produced within the hollow conical construction of the plug 3. Near the apex of this pocket there is located an outlet port 13, which is capable of being rotated into or out of registration with an outlet passage 14 provided in the casing 1, and to enable the plug to be rotated, the reduced end of the latter is provided with a stem 15, which projects through an opening 16 provided in the outer part of the casing 1. The outer end of the stem 15 is equipped with a handle or other actuating device 17, which enables the plug 3 to be exteriorly manipulated. By operating the handle 17, the port 13 may be brought into registration with the passage 14 so that the flow of fluid through and from the valve may be effected. By the construction described, it will be manifest that it will be difficult for any looseness to exist between the plug 3 and the walls of the socket 2, a feature which is effected by means of the sleeve 5. By rotating the sleeve, the same may be threaded into firm frictional relation with the enlarged end of the plug 3, so that the latter will be securely forced into tight engagement with the walls of the socket 2. This feature will then prevent foreign matter contained within the fluid from working itself in between the plug and the socket walls, and hence the valve is rendered effective and thoroughly capable of overcoming leaky or other faulty conditions. It will be apparent that owing to the tight connection between the inner end of the sleeve 5 and the cooperating end of the plug 3, the entrance of foreign matter between these elements will be precluded, and that owing to the tight connection between the plug and its socket foreign matter passing through the port 13 will be prevented from working itself between the plug and the socket wall. In fact, such foreign matter would be cut or sheared by the walls of the opening or port 13 when the plug is rotated. Also, the use of the sleeve enables the stem 15 to project through the opening 16 without employing a gland or other packing. It will be apparent that this construction while simple fundamentally, improves considerably the construction disclosed in my aforesaid patent by producing a valve structure which is more positive in operation, light in weight and economical to manufacture. The construction disclosed in Figure 2 is identical with that above described, with the exception that the pipe 6$^a$ is of relatively short construction and has its inner end threaded as at 18 into the side of a locomotive boiler 19. The construction of the valve admirably lends itself for use in connection with locomotive boilers for the purpose of retaining the high fluid pressures within such boilers by eliminating valve leaks and also in the protection of a valve wherein the presence of foreign matter, such as lime, will not be enabled to work its way into the valve structure in such manner as to destroy or minimize the effects of the valve plug. Also, the construction of the plug enables the latter to be freely rotated when under relatively high fluid pressures, since adhesive action of the lime on the sides of the plug and the socket walls is prevented by the elimination of the lime deposit itself.

What is claimed is:

In a valve, a casing having a conical plug socket formed therein and an enlarged threaded portion extending from said socket, a hollow valve plug arranged to be rotatably engaged in said socket, a ring threaded in said threaded portion for engaging the plug to force the same into the socket, a fluid supply pipe having a collar thereon, a nut threaded on the casing and having an annular lip carried thereby for engaging said collar, a gasket disposed between the collar and ring, said nut serving to urge the gasket into engagement with the ring, whereby the gasket is held in tight engagement with the ring to hold the same against accidental rotation.

In testimony whereof I affix my signature.

JOHN P. CULLISON.